March 9, 1954   J. W. MILLER   2,671,430
POULTRY FOUNTAIN WITH WATER HEATING MEANS
Filed May 3, 1951
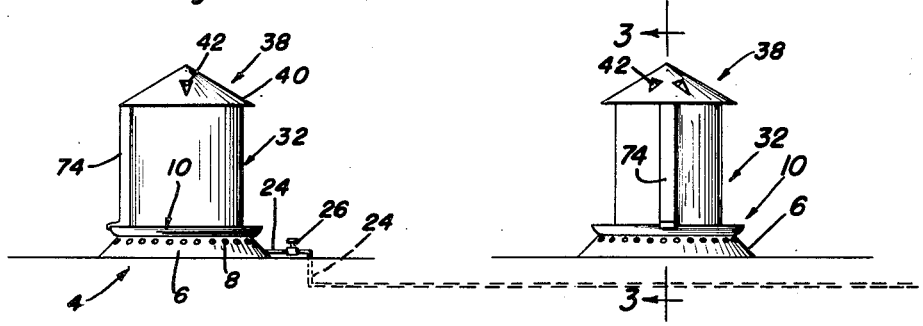
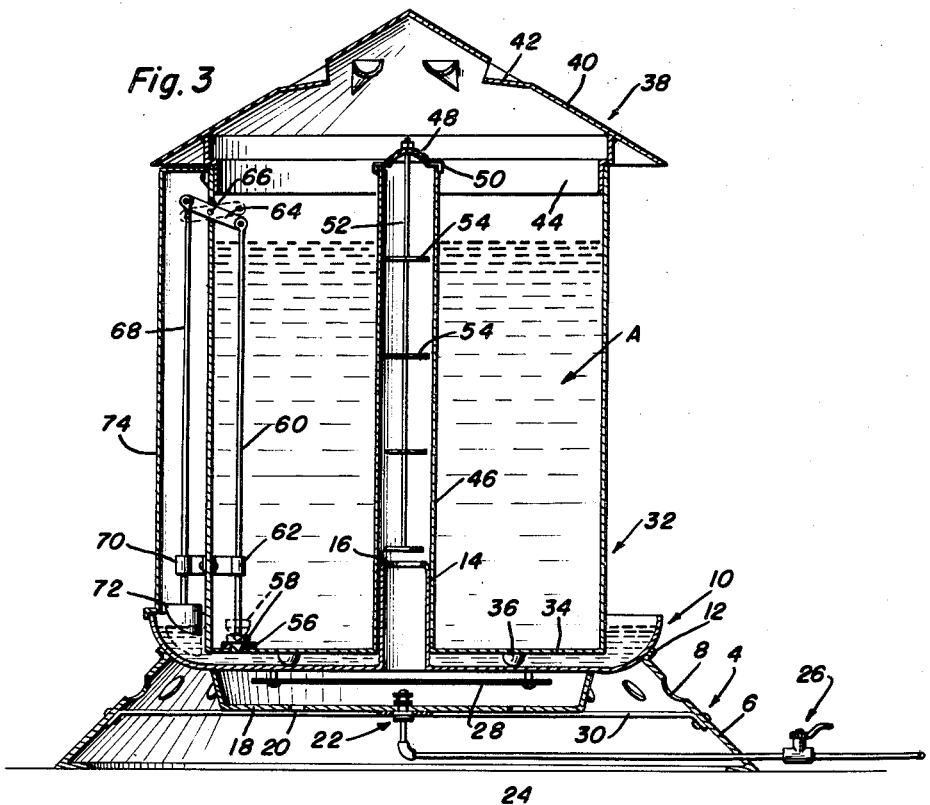
John W. Miller
INVENTOR.

Patented Mar. 9, 1954

2,671,430

UNITED STATES PATENT OFFICE 2,671,430

POULTRY FOUNTAIN WITH WATER HEATING MEANS

John W. Miller, Davenport, Iowa

Application May 3, 1951, Serial No. 224,388

1 Claim. (Cl. 119—73)

The present invention relates to certain new and useful improvements in what is believed to be a highly practical and desirable poultry fountain, and has reference in particular to a construction in which the number of mechanical expedients entering into the over-all combination is reduced, thereby not only increasing the efficiency of the structure as a whole, but rendering same less costly to manufacture, and to otherwise simplify the factors of assembling, sale and use.

It is a general objective to structurally, functionally and otherwise improve upon heater-equipped drinking fountains through the medium of one in which manufacturers and users will find their essential requirements and needs fully met, contained and effectually available.

Since the art to which the invention relates is well developed, it will be understood that the more specific objectives have to do with improvements which are essentially structural in nature. One improvement, therefore, has to do with a simple and practical base which includes a water receiving pan which functions as the trough, said pan being provided on its under side with a pan-like housing for a burner, said housing having a spreader plate therein for the flame which issues from the burner.

Novelty is also predicated on a water containing and supplying tank which has float valve regulated means and which serves to supply water under gravity into said pan. The tank also has a water heating flue and a readily applicable and removable cover.

Other objects and advantages will become more readily apparent from the following description and the accompanying sheet of illustrative drawings:

In the accompanying sheet of drawings, wherein like numerals are employed to designate like parts throughout the views:

Figure 1 is a side elevational view of a heated poultry drinking fountain constructed in accordance with the principles of the present invention.

Figure 2 is a view at right angles to Figure 1.

Figure 3 is a central vertical sectional view on an enlarged scale, taken on the plane of the vertical line 3—3 of Figure 2 looking in the direction of the arrows.

Reference is had to the details and the assembly thereof completely shown in Figure 3. Here the base unit is denoted by the numeral 4 and is characterized by a truncated conical annulus 6 which forms the base proper and which has air inlet holes 8. The upper truncated end of this base supports a circular substantially shallow water-receiving and poultry-feeding pan 10. This is removably seated on the base, as at 12. The pan is provided at its center with an upstanding tubular nipple 14 having a restricted or reduced upper end portion 16. Suitably supported beneath the central portion of the pan is a pan-like burner housing 18 having air intake holes 20. This housing serves to accommodate a suitable gas or equivalent burner 22 carried by the gas supply pipe 24 which has a suitable cut-off valve 26. The numeral 28 designates a circular baffle disk which is mounted in the housing 18 and overlies the burner 22 and underlies the inlet end of the nipple 14. If desired, a suitable spider or brace 30 may be provided.

The water reserve, containing and supplying tank is denoted by the numeral 32, and this is of suitable material, shape and dimensions. It is preferably cylindrical and has a closed bottom 34 with rests or feet 36 resting on the bottom of the pan. There is a cover 38 which lids over the upper open end portion of the tank and said cover is essentially conical, as at 40, and provided with suitable vents 42. There is an annular attaching collar 44 carried by the under side of the cover, and this is fitted frictionally and telescopically into the upper open end portion of the tank. The bottom of the tank is provided with an upstanding, centrally disposed flue 46 which is fitted frictionally and telescopically over the nipple in the manner shown. The numeral 48 designates a small dome having supporting hooks 50 resting on the upper end of the flue. The dome provides a support for a depending rod 52 which is provided with circular or equivalent baffles 54 at vertically spaced points. In the bottom of the tank, there is a suitable valve seat and water discharge opening 56 which empties into the pan 10 in an obvious manner. The port is normally closed by a ball or equivalent valve 58 which is mounted on the lower end of the lifting and lowering rod 60 which is operable through the guide 62. The upper end of the rod is connected with a rocker 64 which is suitably pivoted in an opening in the tank, as at 66. This link or crank also lifts and lowers a complemental depending rod 68, which rod operates through a guide 70 and is provided on its lower end with a cork or equivalent float 72 which is located in the water in the trough or pan, as shown in full and dotted lines toward the left in Figure 3. The numeral 74 designates an appropriate shield for the float, guide bracket 72, rod 68, and link means 64. The water in the tank is denoted at A. By removing the cover or lid, the tank may be filled with fresh water. Then, the sleeve-like flue 46 is fitted telescopically and frictionally over the assembling and retention nipple 14. This centers and interconnects the tank and pan portion of the base. The valve 58 is normally closed on its seat 56, as shown in full lines. When, however, the float 72 sinks down to the low level position shown in dotted lines, the two rods 60, 68 and link means 64 serves to lift the valve 58 to open or dotted line position as shown. Water now flows from the space A in the tank into the pan 10 and fills the pan to the desired level. Then, the valve closes off automatically, in an obvious manner.

When the burner is lighted, the housing 18 and flame spreader 28 serve to generate and uniformly heat the bottom of the pan 10. Also, the heat waves flow upwardly through the flue and heat the flue 46. The discharge of heat particles through the flue 46 are delayed by the action of the baffle disks 54 and also the dome-like top piece 48. What with the burner turned "off" and "on" as desired, the water in the tank may be heated, and thus this heated water will be automatically supplied by the stated valve means into the drinking pan or trough.

In view of the foregoing description taken in conjunction with the accompanying drawings, it is believed that a clear understanding of the device will be quite apparent to those skilled in this art. A more detailed description is accordingly deemed unnecessary.

Minor changes in shape, size, materials and arrangement of parts may be resorted to in actual practice without departing from the spirit and scope of the invention as claimed.

Having described the invention, what is claimed as new is:

In a poultry fountain, a base unit of general annular form, a circular shallow watering pan mounted atop said base unit, said pan being centrally apertured and having an upstanding thimble integrated with the bottom of the pan and rising from the central aperture, a valved water containing and supplying tank including a bottom having depending supporting and spacing feet resting on the bottom of the pan and providing a water circulating space between the bottom of the tank and bottom of the pan, the bottom of said tank having an upstanding flue, the lower end of which is fitted telescopically and frictionally over said thimble constituting the essential means for maintaining the tank and pan in assembled but knockdown relationship, said pan being of a diameter greater than the diameter of the tank, said flue extending centrally through the tank and terminating adjacent the upper end of the tank, distributive baffle means mounted in said flue, a burner, and a burner housing attached to the underside of the pan and cooperatively associating the burner with the thimble and flue.

JOHN W. MILLER.

References Cited in the file of this patent

UNITED STATES PATENTS

| Number | Name | Date |
|---|---|---|
| 961,831 | Ashcraft | June 21, 1910 |
| 1,052,631 | Waters | Feb. 11, 1913 |
| 1,125,806 | Brooks | Jan. 19, 1915 |
| 1,325,640 | Holland et al. | Dec. 23, 1919 |
| 1,343,010 | Schell | June 8, 1920 |
| 1,614,394 | Robison | Jan. 11, 1927 |
| 1,821,478 | Pledger | Sept. 1, 1931 |
| 1,929,789 | Olson | Oct. 10, 1933 |
| 2,068,981 | Hanny | Jan. 26, 1937 |
| 2,230,239 | Eastman | Feb. 4, 1941 |
| 2,242,693 | Benson | May 20, 1941 |